United States Patent
Smith et al.

(10) Patent No.: US 11,330,039 B2
(45) Date of Patent: May 10, 2022

(54) APPLICATION CLASSIFICATION

(71) Applicant: T-Mobile USA, Inc., Bellevue, WA (US)

(72) Inventors: Jeffery A. Smith, Bothell, WA (US); Arundhati Ghosh, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/513,603

(22) Filed: Jul. 16, 2019

(65) Prior Publication Data

US 2021/0021666 A1  Jan. 21, 2021

(51) Int. Cl.
| | |
|---|---|
| *H04L 29/08* | (2006.01) |
| *H04L 12/26* | (2006.01) |
| *G06K 9/62* | (2006.01) |
| *H04W 24/08* | (2009.01) |
| *H04L 67/025* | (2022.01) |
| *H04L 43/062* | (2022.01) |
| *H04L 43/045* | (2022.01) |
| *H04L 43/08* | (2022.01) |
| *H04L 43/067* | (2022.01) |

(52) U.S. Cl.
CPC ............ *H04L 67/025* (2013.01); *G06K 9/626* (2013.01); *H04L 43/045* (2013.01); *H04L 43/062* (2013.01); *H04L 43/067* (2013.01); *H04L 43/08* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 9,323,643 | B1* | 4/2016 | Julkunen | G06Q 30/02 |
| 2013/0078949 | A1* | 3/2013 | Pecen | H04W 12/0027 |
| | | | | 455/411 |
| 2014/0036697 | A1* | 2/2014 | Annan | H04L 67/22 |
| | | | | 370/252 |
| 2014/0155085 | A1* | 6/2014 | Kosseifi | H04W 24/10 |
| | | | | 455/456.1 |
| 2015/0304880 | A1* | 10/2015 | Kotecha | H04W 76/27 |
| | | | | 455/437 |
| 2020/0044927 | A1* | 2/2020 | Apostolopoulos | H04L 43/02 |

OTHER PUBLICATIONS

Qiang Xu et al. "Automatic Generation of Mobile App Signatures from Traffic Observations", 2015, IEEE, pp. 1481-1489.*

* cited by examiner

*Primary Examiner* — Lance Leonard Barry
*Assistant Examiner* — Mohammad Yousuf A. Mian
(74) *Attorney, Agent, or Firm* — Lee & Hayes, P.C.

(57) ABSTRACT

A computing system may automatically classify applications that are used via a communication network. Application classification may include identifying a signature or group of signatures that belongs to an application or service associated with data flow through a network. The computer system of the network may collect data regarding the application from a mobile device, from the network, and/or from a digital distribution service accessible via the network. The system may combine such data together to identify and classify the application.

19 Claims, 6 Drawing Sheets

302 SEND A COMMAND TO A MOBILE DEVICE (MD) VIA A NETWORK, THE COMMAND CONFIGURED TO REQUEST MD LOG DATA GENERATED BY THE MD, THE MD LOG DATA BASED, AT LEAST IN PART, ON AN APPLICATION

304 IN RESPONSE TO THE COMMAND, RECEIVE THE MD LOG DATA FROM THE MD

306 RECEIVE NETWORK DATA FROM A LOG OF HISTORICAL DATA OF TRAFFIC ON THE NETWORK, THE TRAFFIC BEING ASSOCIATED WITH THE APPLICATION AND HAVING BEEN SENT AND/OR RECEIVED TO/FROM ONE OR MORE DESTINATIONS ON THE INTERNET

308 GENERATE COMBINED DATA BY COMBINING THE MD LOG DATA AND THE NETWORK DATA

310 IDENTIFY AT LEAST ONE MATCHING PATTERN IN THE COMBINED DATA

312 DETERMINE A CLASSIFICATION OF THE APPLICATION BASED ON THE IDENTIFIED MATCHING PATTERN

APPLICATION CLASSIFICATION

BACKGROUND

In recent years, telecommunication devices have advanced from offering simple voice calling services within wireless communication networks to providing users with many features, such as email, text messaging, and access to various types of applications available to a mobile device via the Internet. In the past, the number of such applications, and the impact they could have on a communication network, was relatively small. More recently, user demand for mobile applications has increased to where data traffic on a typical communication network is primarily that of these applications, of which there are millions.

Application classification is a process involving identification of a signature or a group of signatures that is associated with an application or service that takes place on a communication network. Generally, application classification may allow for a determination and identification of various aspects of mobile applications' use by mobile devices on a network.

With the vast amount of data traffic on a typical communication network, performing application classification for the traffic on the network may yield results having an accuracy and timeliness that may fall short of being useful. For example, the time that it may take to yield results of a typical application classification may be months or years, and the results may be outdated and incorrect.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and architectures that allow a computing system to automatically classify applications and application platforms that are used via a communication network. For example, executable code of applications may reside in servers connected to the Internet, the Cloud, and/or on a mobile device (MD). Data traffic generated by (or in response to) such applications flows in the communication network (hereinafter, "network"). Application classification includes identifying a signature or group of signatures that belongs to an application, application platform, or service.

Generally, applications may be classified, at a relatively high level, as gaming versus non-gaming, browsing versus non-browsing, and social media versus non-social media, just to name a few examples. Such classifications may include greater granularity for classifying or categorizing more details. Some attributes for classifying and grouping applications may include application category, category group, application family, business process, and software model. For example, the application category may be a grouping attribute that can help identify applications having overlapped or complementary capabilities or functions and can be useful for comparing applications within a category using various metrics.

Application classification may allow for determining relevance and characteristics of network traffic. Such characteristics may lead to understanding, which may be useful for policy enforcement or business insights, by managers or operators of a network regarding activities of their customers of the network. In other words, classifying applications into groups and categories may allow for an organization, such as a network operator, to track and compare the applications, identify relationships and redundancies between the applications, build an applications inventory, fine tune operations (e.g., adjust bandwidth for different types of data traffic) of the network, and map applications to business functions, just to name a few examples.

Generally, there are a very large number of applications, of which there are many types or categories, on a network. Moreover, some applications are related to other applications (e.g., a platform having overlapped or interdependent functionality) while other applications are independent. Among the millions of applications, only a relatively small number of applications account for a large portion of traffic on a network. New applications are introduced to the network daily, and existing applications may change their functionality and/or content. Because of these and other factors, classifying applications accurately, correctly, or in a timely manner may be challenging.

In various embodiments, a system of a network may classify applications by collecting information from an MD (e.g., a user device), log data of the network, and/or from a digital distribution service accessible via the network (e.g., an on-line Internet service, such as that offered by Google (Google Play®) or Apple® (App Store®). The system may combine such information together. In a particular embodiment, the system may combine log data generated by an application residing on the MD with data from a log(s) of historical data of traffic on the network. The application on the MD may be of a type that logs activities and usage of other applications on the MD. Such traffic may be associated with an application to be classified, the traffic having been sent between the MD and one or more destinations on the Internet. The system may use a pattern matching algorithm to identify at least one matching pattern in the combined data, and the classification of the application may be based on the identified matching pattern.

Figure 1:
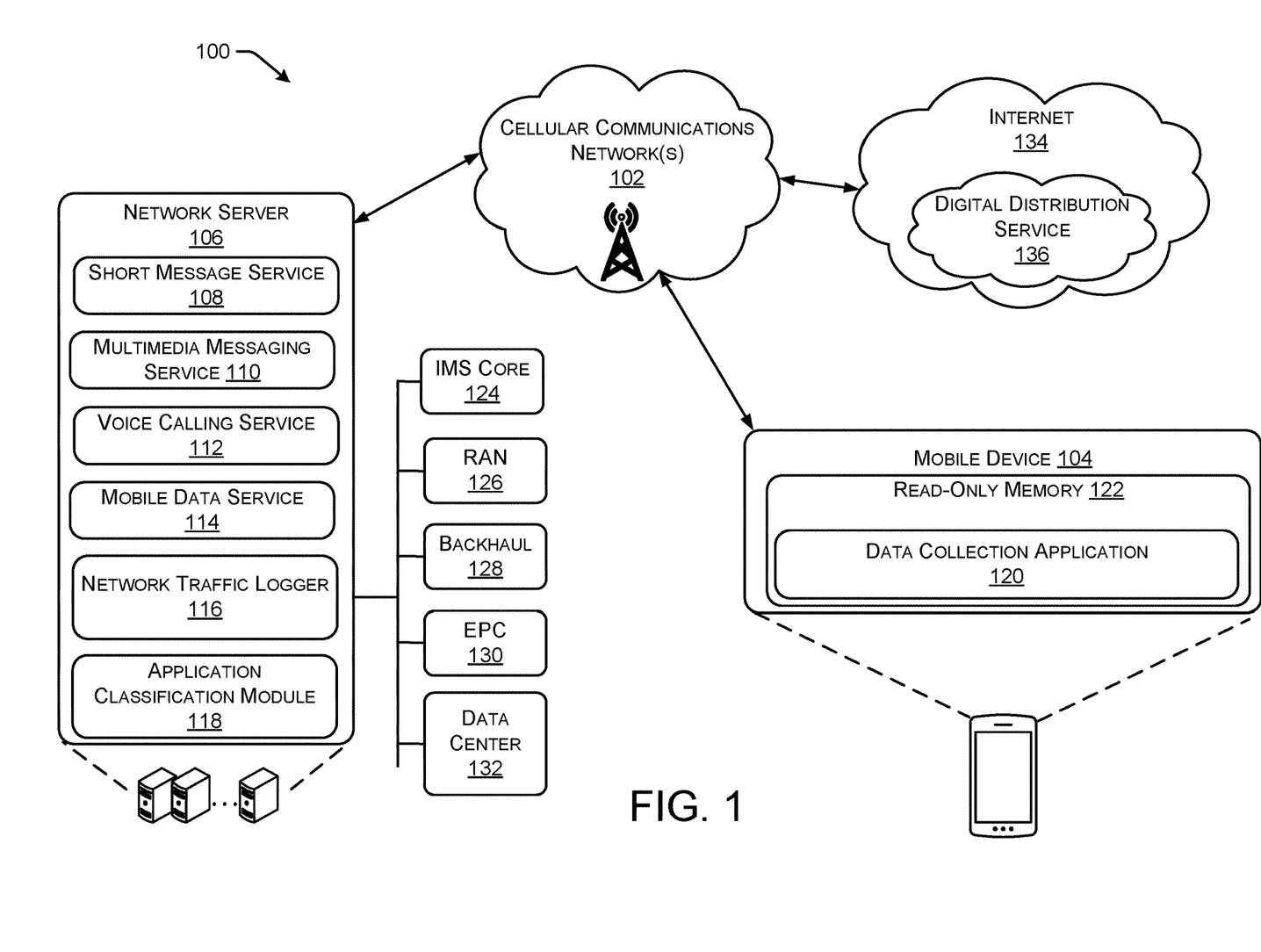
FIG. 1 schematically illustrates a system that includes a cellular communications network, according to various embodiments.

FIG. 1 schematically illustrates a system 100 that includes a cellular communications network 102, according to various embodiments. Cellular communications network(s) 102 (e.g., "network") may be implemented by a cellular services provider, such as T-Mobile®, Verizon Wireless®, AT&T®, etc. System 100 may be configured for classifying applications engaged by (e.g., executed by or initiated by) an MD 104. MD 104 may communicate with one or more other electronic devices and/or systems via network 102.

A network server 106, which may comprise one or more servers, may provide operational equipment and infrastructure management in support of network 102. Network server 106 may provide back-end delivery and support of cellular network services including, for example, a short message service (SMS) 108, a multimedia messaging service (MMS) 110, a voice calling service 112, and a mobile data service 114. Network 102 may also include a network traffic logger 116 and an application classification module 118.

Network server 106 may include and/or communicate with various types of operational equipment that support the cellular communications network, such as servers, routers, firewalls, hubs, switches, and so forth. Many of the operational equipment elements communicate over a non-cellular IP (Internet Protocol) network for purposes of control and reporting. For example, multiple components of system 100 may communicate application classification information to network management hosts on network 102 and to and from a data collection application 120 operating on MD 104. Data collection application 120 may reside in read-only memory 122 of MD 104, for example. In one embodiment, MD 104 includes data collection (e.g., logging) application 120 stored on ROM 122 of MD 104. Data collection application 120 may include one or more instruction sets that, upon execution, record (e.g., log) activities of MD 104 that are associated with other applications residing on and/or executed by MD 104.

Application classification information may be communicated using protocols such as SNMP (Simple Network Management Protocol), EMS (Element Management System), and MMS (Manufacturing Message Specification). For purposes of illustration, these parts and components are represented as network elements including, for example, an IMS (IP Multimedia Subsystem) Core 124, a RAN (Radio Access Network) 126, a Backhaul 128, an EPC (Evolved Packet Core) 130, and a data center 132. System 100 may include multiple instances of any of the illustrated network elements 124-132 and/or other elements that are not shown. System 100 may be distributed over a very large region, such as over an entire country or a portion of a country. System 100 may implement a GSM (global system for mobile communications) network, as one example.

System 100 may include at least portions of the Internet 134, such as those portions (e.g., the Cloud) that include (mobile) applications executed in response to communication with MD 104. Internet 134 may include a digital distribution service (DDS) 136 that procures mobile applications, such as an on-line digital store. For example, DDS 136 may sell, share, or distribute any number of applications that may be downloaded to MD 104. In some embodiments, DDS 136 may include processors that execute applications (e.g., in the Cloud) during engagement with MD 104, which may execute an associated application residing in MD 104. For example, MD 104 may host a texting application for which an associated application, which performs data storage and computing, resides on servers in the Cloud. DDS 136 may be a source for the texting application that resides on MD 104 and/or the associated application in the Cloud.

MD 104 may be configured to communicate on network 102 using network services 108-114, depicted with respect to network server 102. Accordingly, MD 104 may also include hardware and software supporting communications services such as a SMS, a MMS, a voice calling service, and a mobile data service, among other wireless access technologies. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of wireless access technology.

Although various elements of FIG. 1 are shown and described as being discrete devices or components for purposes of discussion, any of the illustrated computing elements may, in practice, include one or more physical, virtual, or otherwise abstracted cluster or network of machines and/or devices. For example, although network server 106 may be depicted as a single entity, it may comprise any one or more computing devices, including physical devices and virtual computing units, and including network-based devices that are commonly referred to as being in the cloud. Moreover, although a single mobile device (MD 104) is depicted, it should be appreciated that system 100 may include any number and types of mobile devices, and of such devices, MD 104 is merely a singular non-limiting example.

Figure 2:
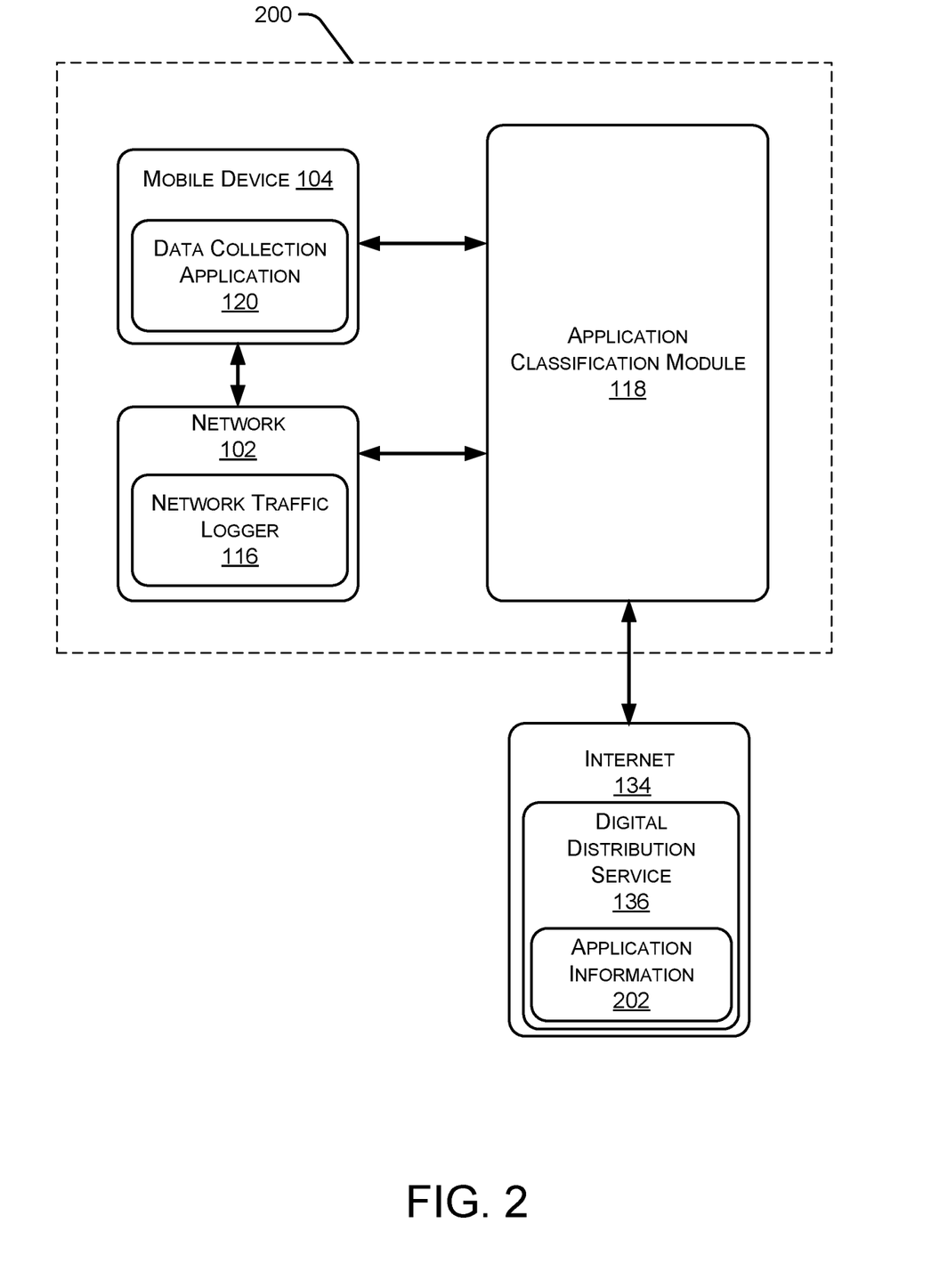
FIG. 2 is a block diagram of a system for classifying applications, according to various embodiments.

FIG. 2 is a block diagram illustrating an application classification system (ACS) 200, which is a portion of system 100 of FIG. 1, according to various embodiments. ACS 200 includes application classification module 118 that is communicably coupled to cellular communications network 102 and mobile device 104. In some implementations, application classification module 118, which may be implemented by a cellular services provider, may be communicably coupled to Internet 134. Application classification module 118 may be configured for classifying applications engaged by (e.g., executed by or initiated by) MD 104. Network 102 includes network server 106, illustrated in FIG. 1, which comprises network traffic logger 116. MD 104, communicably coupled to network 102, includes data collection application 120.

In some embodiments, network traffic logger 116 may be communicably coupled to a packet data network gateway (P-gateway) that may provide connectivity between MD 104 and external packet data networks (PDNs) by being a point of exit and entry of traffic for MD 104. In some implementations, MD 104 may have simultaneous connectivity with more than one P-gateway for accessing multiple PDNs. The P-gateway may perform policy enforcement, packet filtering for individual users (e.g., mobile devices), charging support, lawful interception and packet screening. The P-gateway may communicate with the PDNs, for example, using an SGi interface that may act as a reference point between the P-gateway and the PDN. Network traffic logger 116 may receive information regarding traffic data from the P-gateway. For example, such information may comprise type or category of the traffic, source and destination internet protocol (IP) addresses and port protocols, source and destination domain names or server name indications (SNIs), timestamps of the traffic, and size of the traffic, among other things. Network traffic logger 116 may store the information, which may be accessible by application classification module 118.

In various embodiments, MD 104 includes data collection application 120 that may monitor and collect information (e.g., continuously or from time to time) regarding run-time activities of applications or (at least portions of) application platforms executed by MD 104. Data collection application 120 may timestamp such activities. The information collected may comprise application names, user ID (UID) of the applications, type or category of the applications, destination IP addresses and domain names (or SNIs), the timestamps, and quantity of data associated with the respective application communicated between MD 104 and network 102, among other things.

In various embodiments, ACM 118 may send a request to MD 104 to receive data collected and stored by data collection application 120. In some implementations, data collection application 120 may automatically upload such data to ACM 118 periodically or from time to time. The data received from MD 104 may be translated (e.g., by data collection application 120 or ACM 118) to a format that is readable by ACM 118. ACM 118 may combine the data received from MD 104 with information collected by network traffic logger 116 on network 102.

In some implementations, ACM 118 may receive information from various sources on the Internet 134. For example, digital distribution service 136 may comprise application information 202, which may be a database, regarding descriptions of applications or application platforms provided by digital distribution service 136. Description of an application may include name, type (gaming, non-gaming, browsing, non-browsing, social media, non-social media, and so on), popularity, rating (e.g., overall rating and/or content rating), genre, related application(s), and publication date(s), just to name a few examples. ACM 118 may combine the data received from Internet 134 with information collected by network traffic logger 116 and MD 104.

ACM 118 may apply one or more of various processes to combine data from network traffic logger 116, data from data collection application 120, and/or application information 202. For example, ACM 118 may perform data wrangling, which is a process of transforming and mapping data from one data format into another format, for example, with the intent of making the data more appropriate and valuable for a variety of downstream purposes such as analytical processes carried out by ACM 118. Generally, such data wrangling may involve extracting data in a raw form from a data source, sorting the raw data using algorithms or parsing the raw data into predefined data structures, and depositing resulting content into a data sink for storage and future use by ACM 118. Data wrangling may further involve data visualization, data aggregation, and training a statistical model, just to name a few examples. In various implementations, a link between network traffic logger 116 and data collection application 120 may involve a 5-Tuple gathered from Layer 3 and 4 of an open systems interconnection (OSI) model. This allows for such information to be visible on the device and network logs. The 5-Tuple may include IP Protocol, Source IP, Destination IP, Source Port, and Destination Port. A timestamp from network traffic logger 116 and/or data collection application 120 may also be considered while determining data matches (e.g., as described below) within a time window, for example. For a specific detailed example, consider a case where: Timestamp=1559540000, IP Protocol=6 (TCP), Source IP=192.168.1.1, Destination IP=10.0.0.1, Source Port=49499, Destination Port=443, Network Logs Example: 1559540001,6,192.168.1.1,10.0.0.1,49499,443, UE Logs Example: 559540000,6,192.168.1.1,10.0.0.1,49499,443.

ACM 118 may apply one or more of various processes to the combination of data for detecting and/or classifying applications. For example, ACM 118 may use a pattern matching algorithm to identify at least one matching pattern in the combined data. Detecting or classifying an application may be based on an identified matching pattern and/or a nearest approximation of a matching pattern. For instance, applications often have signatures unique to the application. Such signatures may be used for a base application, but the applications may also have signatures that are not unique to the base application. Examples of such applications include Facebook's Graph API®, Google Analytics®, application performance analytics, and advertisements, among others.

Figure 3:
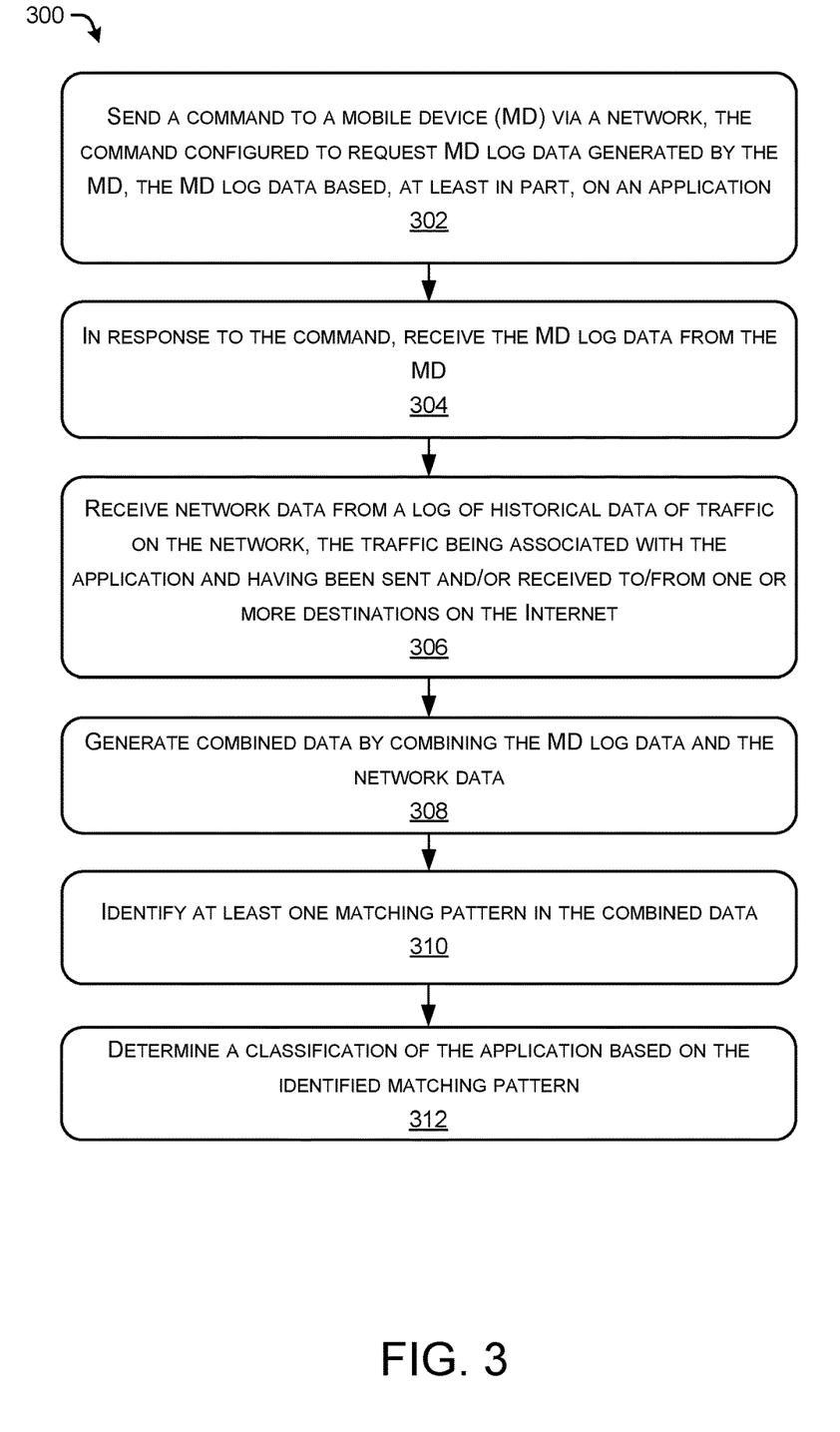
FIG. 3 illustrates a flow diagram for determining a classification of an application, according to some embodiments.

FIG. 3 illustrates a flow diagram of a process 300 of a system, such as 100, for determining a classification of an application, according to some embodiments. The implementation of the various components described herein is a matter of choice dependent on the performance and other requirements of the computing system. Accordingly, logical operations described herein may be referred to variously as operations, structural devices, acts, processes, or modules. These operations, structural devices, acts, processes, and modules can be implemented in software, in firmware, in special purpose digital logic, and any combination thereof. More or fewer operations can be performed than shown in the figures and described herein. These operations can also be performed in parallel, or in a different order than described herein. Some or all of these operations might also be performed by components other than those specifically identified. For example, process 300 may be performed by server 106, illustrated in FIG. 1, or more specifically, in some examples, may be performed by ACM 118. Though the following example description of process 300 describes server 106 as performing at least a portion of the process, claimed subject matter is not so limited.

At 302, the server may send a command configured to request log data generated by the MD. The server may send the command to the MD via a network (e.g., 102). The log data, which may be generated by data collection application 120, may be based, at least in part, on an application, such as run-time activities of the application or an application platform executed by MD 104. The log data may comprise application name, user ID (UID) of the application, type or category of the application, destination IP address and domain name (or SNI), timestamps, and quantity of data associated with the respective application communicated between MD 104 and the network, for example. At 304, in response to the command, the server may receive the log data from the MD, via the network.

At 306, the server may receive network data from a log of historical data of traffic on the network. Such historical data may be generated by traffic logger 116 and comprise information regarding traffic data associated with an application and being from the P-gateway. For example, the historical data may comprise type or category of the traffic, source and destination internet protocol (IP) addresses and port protocols, source and destination domain names (e.g., such as server name indications (SNIs)), timestamps of the traffic, and size of the traffic, among other things. In some implementations, historical data of traffic on the network may be based on event data records (EDR), which may comprise duration of the traffic, data volume of the traffic, and web site/content accessed with the traffic, just to name a few examples.

At 308, the server may generate, using ACM 118 for example, combined data by combining the log data and the historical data of the network. This data may be combined using one or more processes described above. For example, the data may be combined and labeled with an application name, which may be used for subsequent traffic by generating an application signature. This results in data being labeled with the correct application rather than just by domain name, which has the possibility of being obfuscated.

At 310, the server may identify at least one matching pattern in the combined data. At 312, the server may determine a classification of the application based on the identified matching pattern.

Figure 4:
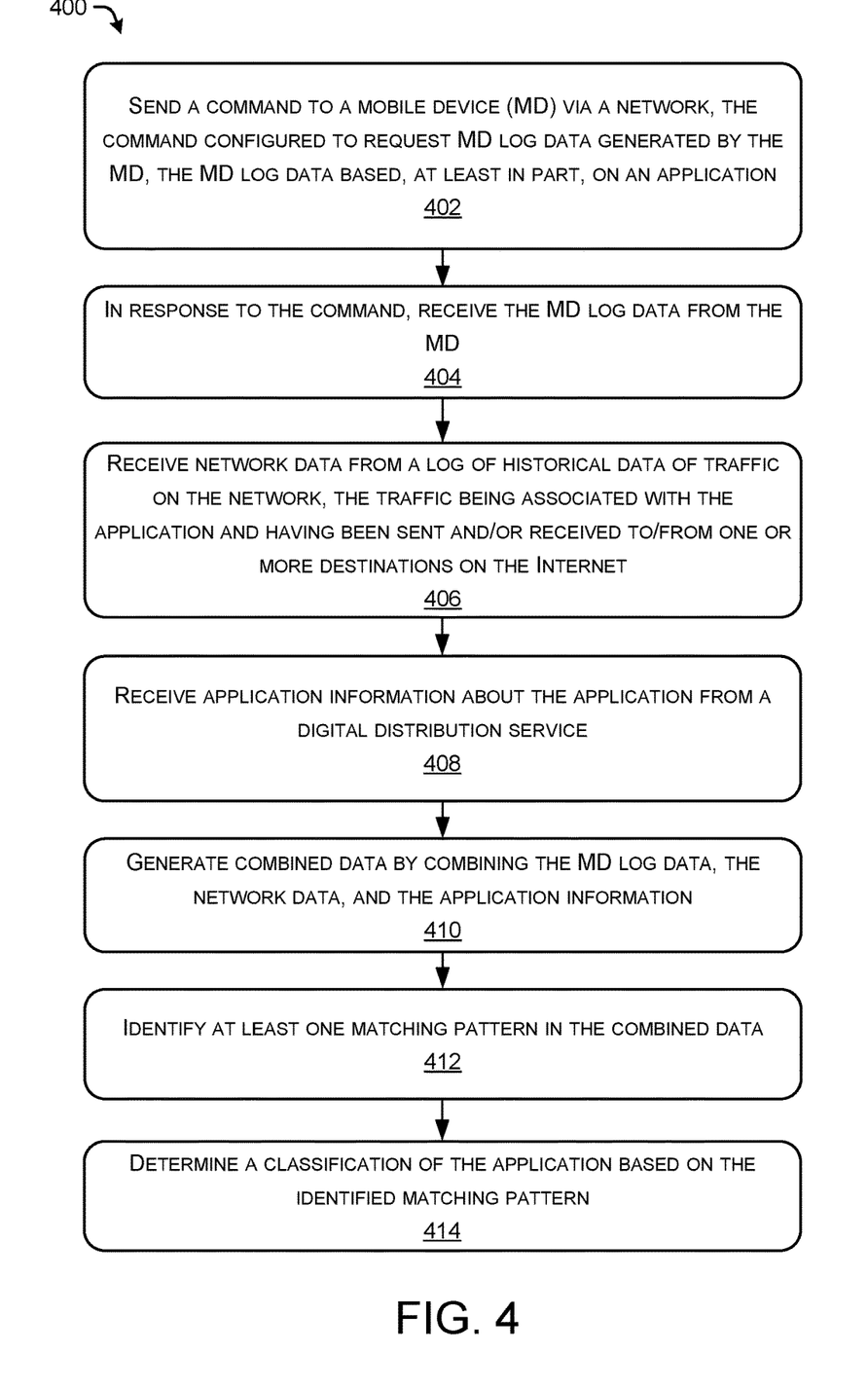
FIG. 4 illustrates another flow diagram for determining a classification of an application, according to some embodiments.

FIG. 4 illustrates a flow diagram of a process 400 of a system for determining a classification of an application, according to some embodiments. Process 400 is similar to process 300 except that an additional source of data (e.g., from e.g., from a digital distribution service) is utilized to determine a classification of an application. As for process 300, process 400 may be performed by server 106, illustrated in FIG. 1, or more specifically, in some examples, may be performed by ACM 118, illustrated in FIGS. 1 and 2.

At 402, the server may send a command configured to request log data generated by the MD. The server may send the command to the MD via a network (e.g., 102). The log data, which may be generated by data collection application 120, may be based, at least in part, on an application, such as run-time activities of the application or an application platform executed by MD 104. The log data may comprise application name, user ID (UID) of the application, type or category of the application, destination IP address and domain name (or SNI), timestamps, and quantity of data associated with the respective application communicated between MD 104 and the network, for example. At 404, in response to the command, the server may receive the log data from the MD, via the network.

At 406, the server may receive network data from a log of historical data of traffic on the network. Such historical data may be generated by traffic logger 116 and comprise information regarding traffic data associated with an application and being from the P-gateway. For example, the historical data may comprise type or category of the traffic, source and destination internet protocol (IP) addresses and port protocols, source and destination domain names or server name indications (SNIs), timestamps of the traffic, and size of the traffic, among other things.

At 408, the server may receive application information about the application from a digital distribution service on the Internet, such as 136 illustrated in FIG. 2. As described above, the digital distribution service may sell, share, or distribute any number of applications that may be downloaded to an MD. At block 410, the server may generate combined data by combining the MD log data, the network data, and the application information. At 412, the server may identify at least one matching pattern in the combined data. At 414, the server may determine a classification of the application based on the identified matching pattern.

Figure 5:
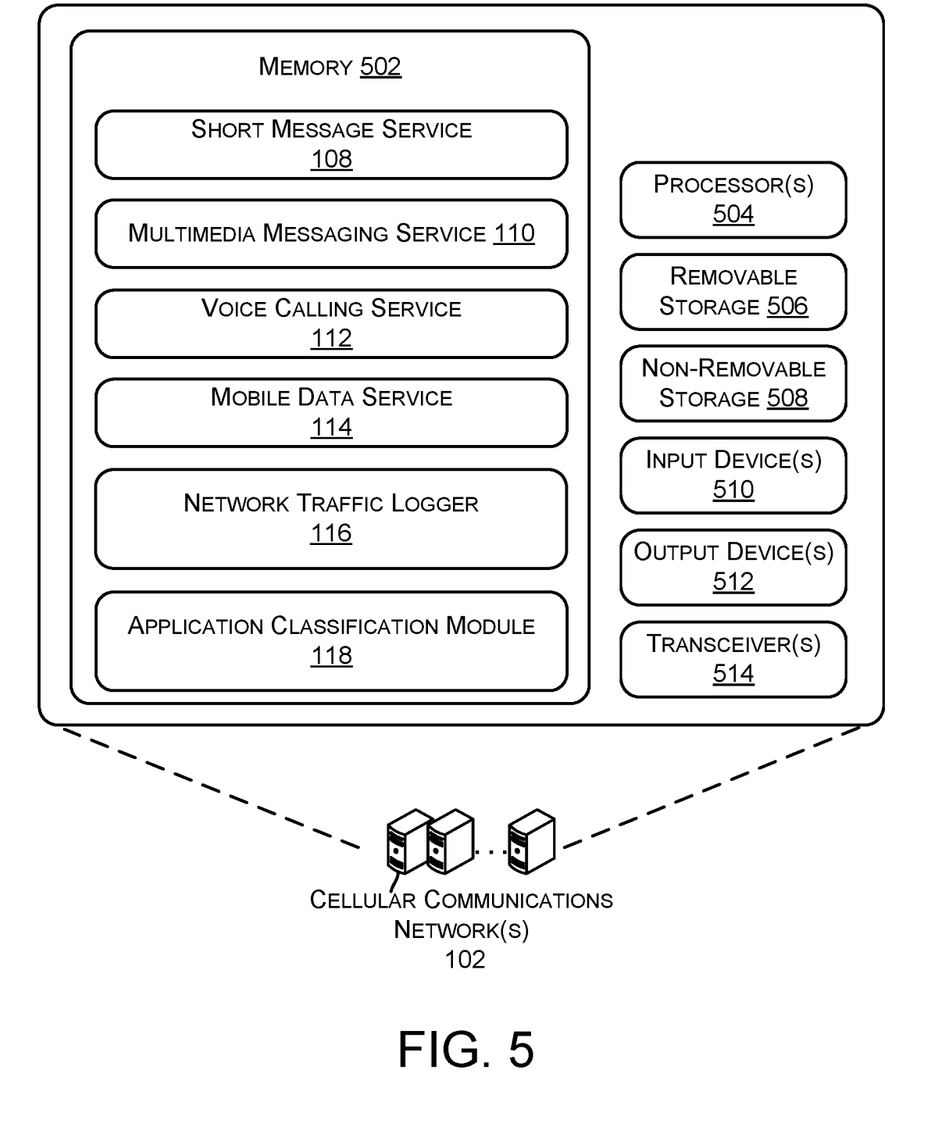
FIG. 5 illustrates a block diagram of a network server, according to various embodiments.

FIG. 5 illustrates some details of network 102, first illustrated in FIG. 1, configured to classify applications engaged by MD 104, for example. Network 102 may be used to implement the various operations described herein. Network 102 may be implemented as a single device or as a plurality of devices with modules and data distributed among them. Network 102 may include memory 502 storing executable code and data for SMS 108, MMS 110, voice calling service 112, mobile data service 114, network traffic logger 116, and application classification module 118, as described herein. Network 102 includes one or more processor(s) 504, a removable storage 506, a non-removable storage 508, input device(s) 510, output device(s) 512, and transceiver(s) 514.

In various embodiments, memory 502 may be volatile (such as RAM), non-volatile (such as ROM, flash memory, etc.), or some combination thereof. SMS 108, MMS 110, voice calling service 112, mobile data service 114, network traffic logger 116, and application classification module 118 may comprise methods, threads, processes, applications, or any other sort of executable instructions. SMS 108, MMS 110, voice calling service 112, mobile data service 114, network traffic logger 116, and application classification module 118 may also include files and databases (not illustrated) storing values associated with expected or nominal settings, values, etc., for the various services described. Various details of SMS 108, MMS 110, voice calling service 112, mobile data service 114, network traffic logger 116, and application classification module 118 are provided above in the discussion of FIG. 1.

In some embodiments, one or more processor(s) 504 are central processing units (CPUs), graphics processing units (GPUs), or both CPU and GPU, or other processing units or components known in the art.

Network 102 may include additional data storage devices (removable and/or non-removable) such as, for example, magnetic disks, optical disks, or tape. Such additional storage is illustrated in FIG. 5 by removable storage 506 and non-removable storage 508. Tangible computer-readable media can include volatile and non-volatile, removable and non-removable media implemented in any method or technology for storage of information, such as computer readable instructions, data structures, program modules, or other data. Memory 502, removable storage 506, and non-removable storage 508 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by network 102. Any such tangible computer-readable media can be part of network 102.

Network 102 also can include input device(s) 510 such as a keypad, a cursor control, a touch-sensitive display, voice input device, etc., and output device(s) 512 such as a display, speakers, printers, haptic feedback, etc.

As illustrated in FIG. 5, network 102 may also include one or more wired or wireless transceiver(s) 514. Transceiver(s) 514 can include a network interface card (NIC), a network adapter, a LAN adapter, or a physical, virtual, or logical address to connect to cellular network(s), Wi-Fi network(s), OEM server(s), and MD 104, for example. To increase throughput when exchanging wireless data, transceiver(s) 514 can utilize multiple-input/multiple-output (MIMO) technology. Transceiver(s) 514 may embody any sort of wireless transceiver device capable of engaging in wireless, radio frequency (RF) communication. Transceiver(s) 514 may also include other wireless modems, such as a modem for engaging in Wi-Fi, WiMAX, Bluetooth, or infrared communication.

Figure 6:
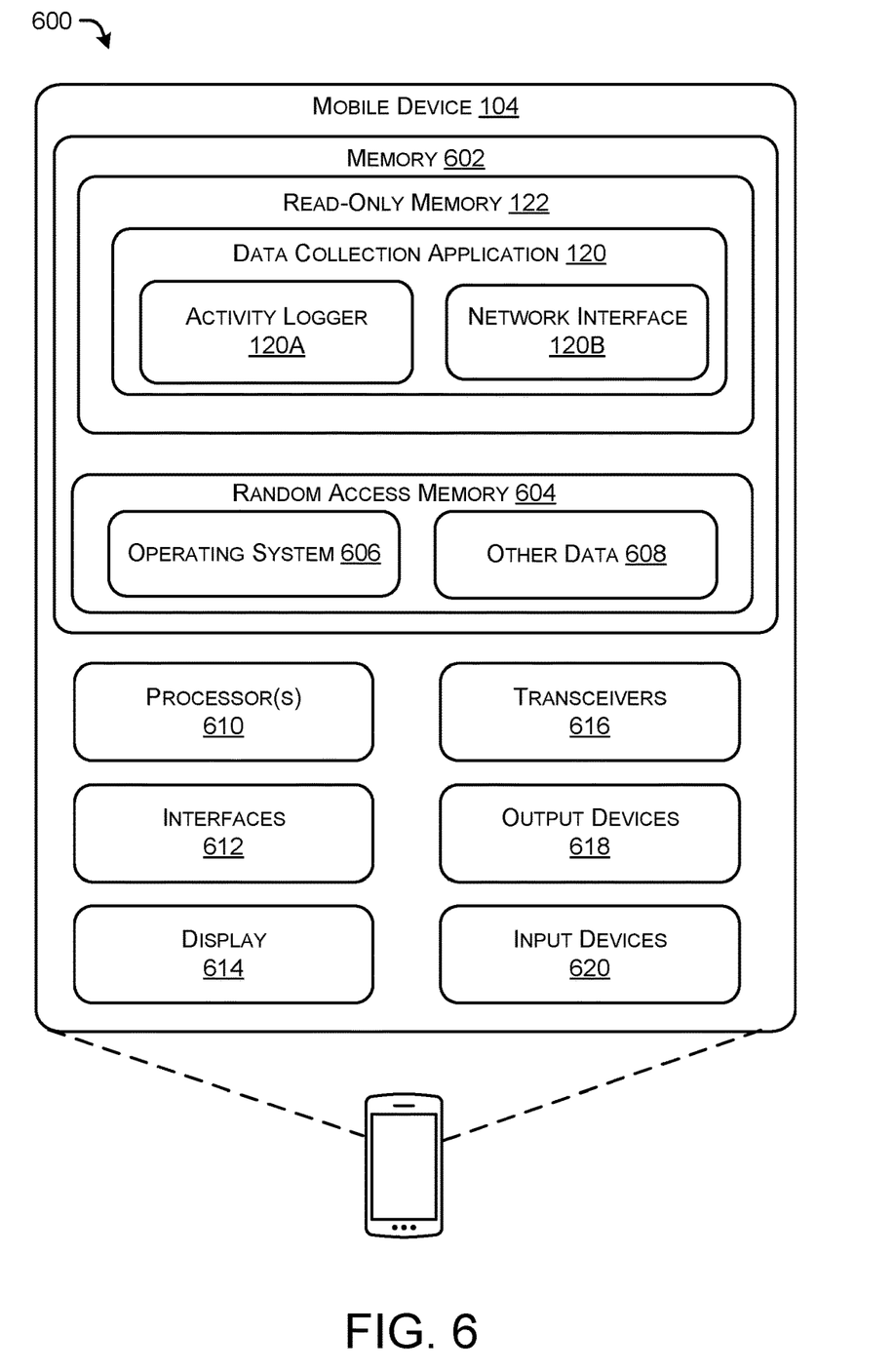
FIG. 6 illustrates a block diagram of a mobile device, according to various embodiments.

FIG. 6 illustrates a component level view of MD 104 configured for classifying applications by network 102, according to various embodiments. MD 104 may include a system memory 602 that includes ROM 122 and a RAM 604. ROM 122 may store data collection application 120, which may comprise one or more individual applications, such as an activity logger 120A and a network interface 120B. For example, activity logger 120A may comprise code executable by MD 104 to log data based, at least in part, on run-time activities of the application or an application platform executed by MD 104. Network interface 120B may comprise code executable by MD 104, and in some implementations, to be executable by network 102, to communicate with network 102. For example, network interface 120B may respond to requests from ACM 118 in network 102 for data collected by activity logger 604.

In some examples, activity logger 120A may be configured to log data regarding application activities associated with one or more services on the MD 104. Such services can include, for example, a short message service (SMS), a multimedia messaging service (MMS), a voice calling service, and a mobile data service, which may communicate with and or otherwise share information with corresponding services on network 102 including SMS 108, MMS 110, voice calling service 112, and/or mobile data service 114.

RAM 604 may include working memory that stores information such as an operating system 606, and other data 608. Other data 608 may include application(s) such as voice calling clients, VoLTE calling clients, Wi-Fi calling clients, messaging applications, email applications, media player applications, video calling applications, video chat applications, web browsers, social media applications, any sort of real-time communication applications, or any other sort of applications. The application(s) embodied as other data 608 may engage in communication with other applications, servers, or devices via a communication link over a network (e.g., the cellular network(s) 102 and/or Wi-Fi network(s), sending and receiving data packets.

ROM 122 and RAM 604 can include non-transitory computer-readable media (which may be non-volatile and volatile, respectively), and may include removable and non-removable tangible, physical media implemented in technology for storage of information, such as computer readable instructions, data structures, program modules, or other data. System memory 602 (and removable storage 506 and non-removable storage 508 as illustrated in FIG. 5) are examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by MD 104. Any such non-transitory computer-readable media may be part of MD 104, the network 102, and/or other components of ACS 200.

MD 104 may further include processor(s) 610 which, in some implementations, may be one or more central processing units (CPUs), graphics processing units (GPUs), or both CPUs and GPUs, or any other sort of processing unit.

MD 104 may further include one or more interfaces 612, a display 614, transceivers 616, output device(s) 618, and input device(s) 620. In some implementations, transceivers 616 may include radios and/or modems, or combinations thereof known in the art. For example, transceivers 616 may include one or more radio transceivers that performs the function of transmitting and receiving radio frequency communications via an antenna (not shown). The radios and/or modems may facilitate wireless connectivity between MD 104 and various devices or one or more networks (e.g., 102). In addition, transceivers 616 may include a near field antenna for communicating over unlicensed wireless IP networks, such as local wireless data networks and personal area networks (e.g., Bluetooth or near field communication (NFC) networks). Further, transceivers 616 may include wired communication components, such as an Ethernet port, that connect the MD 104 in a wired fashion to devices of one or more networks. In various implementations, transceivers 616 may interface with and be controlled by a radio chipset (not shown).

In some implementations, output devices 618 include any sort of output devices known in the art, such as a display (e.g., a liquid crystal display), speakers, a vibrating mechanism, or a tactile feedback mechanism. Output devices 618 also include ports for one or more peripheral devices, such as headphones, peripheral speakers, or a peripheral display.

In various implementations, input device(s) 620 include any sort of input devices known in the art. For example, input device(s) 620 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

EXAMPLE CLAUSES

A. A wireless communication network comprising: one or more processors; a non-transitory storage medium; and instructions stored in the non-transitory storage medium, the instructions being executable by the one or more processors to: send a command to a mobile device (MD) via the wireless communication network, the command configured to request MD log data generated by the MD, the MD log data based, at least in part, on an application; in response to the command, receive the MD log data from the MD; receive network data from a log of historical data of traffic on the wireless communication network, the traffic being associated with the application and having been sent and/or received to/from one or more destinations on the Internet; generate combined data by combining the MD log data and the network data; identify at least one matching pattern in the combined data; and determine a classification of the application based on the identified matching pattern.

B. The wireless communication network of A, wherein the instructions are further executable by the one or more processors to: receive application information about the application from a digital distribution service; generate additional combined data by combining the MD log data, the network data, and the application information; identify at least one additional matching pattern in the additional combined data; and further classify the application based on the additional identified matching pattern.

C. The wireless communication network of B, wherein the application information comprises descriptions of applications or application platforms.

D. The wireless communication network of A, wherein the log of historical data of traffic on the wireless communication network is based on event data records (EDR).

E. The wireless communication network of D, wherein the EDR comprises one or more of duration of the traffic, data volume of the traffic, and web site/content accessed with the traffic.

F. The wireless communication network of A, wherein the instructions are further executable by the one or more processors to: identify the at least one matching pattern in the combined data based, at least in part, on timestamps in the MD log data and the network data.

G. An apparatus comprising: a non-transitory storage medium; and instructions stored in the non-transitory storage medium, the instructions being executable by the apparatus to: send a command to a mobile device (MD) via a network, the command configured to request MD log data generated by the MD, the MD log data based, at least in part, on an application; in response to the command, receive the MD log data from the MD; receive network data from a log of historical data of traffic on the network, the traffic being associated with the application and having been sent and/or received to/from one or more destinations on the Internet; generate combined data by combining the MD log data and the network data; identify at least one matching pattern in the combined data; and determine a classification of the application based on the identified matching pattern.

H. The apparatus of G, wherein the instructions are further executable by the one or more processors to: receive application information about the application from a digital distribution service; generate additional combined data by combining the MD log data, the network data, and the application information; identify at least one additional matching pattern in the additional combined data; and further classify the application based on the additional identified matching pattern.

I. The apparatus of H, wherein the application information comprises descriptions of applications or application platforms.

J. The apparatus of G, wherein the log of historical data of traffic on the network is based on event data records (EDR).

K. The apparatus of J, wherein the EDR comprises one or more of duration of the traffic, data volume of the traffic, and web site/content accessed with the traffic.

L. The apparatus of G, wherein the instructions are further executable by the one or more processors to: identify the at least one matching pattern in the combined data based, at least in part, on timestamps in the MD log data and the network data.

M. The apparatus of G, wherein the instructions are further executable by the one or more processors to: enforce one or more network policies based, at least in part, on the classification of the application N. A computer-implemented method comprising: sending a command to a mobile device (MD) via a network, the command configured to request MD log data generated by the MD, the MD log data based, at least in part, on an application; in response to the command, receiving the MD log data from the MD; receiving network data from a log of historical data of traffic on the network, the traffic being associated with the application and having been sent and/or received to/from one or more destinations on the Internet; generating combined data by combining the MD log data and the network data; identifying at least one matching pattern in the combined data; and determining a classification of the application based on the identified matching pattern.

O. The computer-implemented method of N, further comprising: receiving application information about the application from a digital distribution service; generating additional combined data by combining the MD log data, the network data, and the application information; identifying at least one additional matching pattern in the additional combined data; and further classifying the application based on the additional identified matching pattern.

P. The computer-implemented method of O, wherein the application information comprises descriptions of applications or application platforms.

Q. The computer-implemented method of N, wherein the log of historical data of traffic on the network is based on event data records (EDR).

R. The computer-implemented method of Q, wherein the EDR comprises one or more of duration of the traffic, data volume of the traffic, and web site/content accessed with the traffic.

S. The computer-implemented method of N, further comprising: identifying the at least one matching pattern in the combined data based, at least in part, on timestamps in the MD log data and the network data.

T. The computer-implemented method of N, further comprising enforcing one or more network policies based, at least in part, on the classification of the application.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A wireless communication network comprising:
    one or more processors;
    a non-transitory storage medium; and
    instructions stored in the non-transitory storage medium, the instructions being executable by the one or more processors to:
        send a command to a mobile device (MD) via the wireless communication network, the command configured to request MD log data generated by the MD, the MD log data based, at least in part, on an application;
        in response to the command, receive the MD log data from the MD;
        receive network log data from a log of historical data of traffic on the wireless communication network, the network log data being associated with the application and the traffic, the traffic having been sent and/or received to/from one or more destinations on an Internet;
        generate combined log data associated with the application by combining the MD log data and the network log data, the application not being previously associated with a unique signature;
        utilize a pattern matching algorithm to identify at least one matching pattern in the combined log data;
        determine a classification of the application based, at least in part, on the at least one matching pattern in the combined log data, and on at least one additional matching pattern in additional combined log data, the additional combined log data comprising the combined log data and application information from a digital distribution service; and
        enforce one or more network policies based, at least in part, on the classification of the application.

2. The wireless communication network of claim 1, wherein the application information comprises descriptions of applications or application platforms.

3. The wireless communication network of claim 1, wherein the log of historical data of traffic on the wireless communication network is based, at least in part, on event data records (EDR).

4. The wireless communication network of claim 3, wherein the EDR comprises one or more of duration of the traffic, data volume of the traffic, and web site/content accessed with the traffic.

5. The wireless communication network of claim 1, wherein the instructions are further executable by the one or more processors to:
identify the at least one matching pattern in the combined log data based, at least in part, on timestamps in the MD log data and the network log data.

6. The wireless communication network of claim 1, wherein the MD log data is further received from the MD based, at least in part, on the MD log data being generated by a second application of the MD.

7. The wireless communication network of claim 1, wherein the instructions are further executable by the one or more processors to:
generate an application signature based, at least in part, on the combined log data, the application signature comprising an application name associated with the application.

8. An apparatus comprising:
a non-transitory storage medium; and
instructions stored in the non-transitory storage medium, the instructions being executable by one or more processors of the apparatus to:
send a command to a mobile device (MD) via a network, the command configured to request MD log data generated by the MD, the MD log data based, at least in part, on an application;
in response to the command, receive the MD log data from the MD;
receive network data from a log of historical data of traffic on the network, the traffic being associated with the application and having been sent and/or received to/from one or more destinations on an Internet;
generate combined data associated with the application by combining the MD log data and the network data, the application not being previously associated with a unique signature;
utilize a pattern matching algorithm to identify at least one matching pattern in the combined data;
determine a classification of the application based, at least in part, on the at least one matching pattern, and on at least one additional matching pattern in additional combined data, the additional combined data comprising the combined data and application information from a digital distribution service; and
enforce one or more network policies based, at least in part, on the classification of the application.

9. The apparatus of claim 8, wherein the application information comprises descriptions of applications or application platforms.

10. The apparatus of claim 8, wherein the log of historical data of traffic on the network is based, at least in part, on event data records (EDR).

11. The apparatus of claim 10, wherein the EDR comprises one or more of duration of the traffic, data volume of the traffic, and web site/content accessed with the traffic.

12. The apparatus of claim 8, wherein the instructions are further executable by the one or more processors to:
identify the at least one matching pattern in the combined data based, at least in part, on timestamps in the MD log data and the network data.

13. The apparatus of claim 8, wherein the MD log data is further received from the MD based, at least in part, on the MD log data being generated by a second application of the MD.

14. A computer-implemented method comprising:
sending a command to a mobile device (MD) via a network, the command configured to request MD log data generated by the MD, the MD log data based, at least in part, on an application;
in response to the command, receiving the MD log data from the MD;
receiving network data from a log of historical data of traffic on the network, the traffic being associated with the application and having been sent and/or received to/from one or more destinations on an Internet;
generating combined data associated with the application by combining the MD log data and the network data, the application not being previously associated with a unique signature;
utilizing a pattern matching algorithm to identify at least one matching pattern in the combined data;
determining a classification of the application based, at least in part, on the at least one matching pattern, and on at least one additional matching pattern in additional combined data, the additional combined data comprising the combined data and application information from a digital distribution service; and
enforcing one or more network policies based, at least in part, on the classification of the application.

15. The computer-implemented method of claim 14, wherein the application information comprises descriptions of applications or application platforms.

16. The computer-implemented method of claim 14, wherein the log of historical data of traffic on the network is based, at least in part, on event data records (EDR).

17. The computer-implemented method of claim 16, wherein the EDR comprises one or more of duration of the traffic, data volume of the traffic, and web site/content accessed with the traffic.

18. The computer-implemented method of claim 14, further comprising:
identifying the at least one matching pattern in the combined data based, at least in part, on timestamps in the MD log data and the network data.

19. The computer-implemented method of claim 14, wherein the MD log data is further received from the MD based, at least in part, on the MD log data being generated by a second application of the MD.

* * * * *